(12) United States Patent
Emmanuel et al.

(10) Patent No.: US 10,742,998 B2
(45) Date of Patent: Aug. 11, 2020

(54) TRANSMISSION RATE CONTROL OF DATA COMMUNICATIONS IN A WIRELESS CAMERA SYSTEM

(71) Applicant: NETGEAR, INC., San Jose, CA (US)

(72) Inventors: Joseph Amalan Arul Emmanuel, Cupertino, CA (US); Peiman Amini, Mountain View, CA (US)

(73) Assignee: NETGEAR, INC., San Jose, CA (US)

( * ) Notice: Subject to any disclaimer, the term of this patent is extended or adjusted under 35 U.S.C. 154(b) by 0 days.

(21) Appl. No.: 16/279,895

(22) Filed: Feb. 19, 2019

(65) Prior Publication Data
US 2019/0260496 A1 Aug. 22, 2019

Related U.S. Application Data

(60) Provisional application No. 62/633,017, filed on Feb. 20, 2018.

(51) Int. Cl.
H04N 5/232 (2006.01)
G08B 13/193 (2006.01)
(Continued)

(52) U.S. Cl.
CPC ........... H04N 19/166 (2014.11); G06F 9/542 (2013.01); G06K 9/00771 (2013.01); G06T 7/20 (2013.01); G07C 9/37 (2020.01); G08B 3/10 (2013.01); G08B 3/1016 (2013.01); G08B 5/223 (2013.01); G08B 13/191 (2013.01); G08B 13/193 (2013.01); G08B 13/1966 (2013.01);
(Continued)

(58) Field of Classification Search
CPC ........... H04N 5/23227; H04N 5/23206; H04N 5/247; H04N 17/002; H04N 19/166; H04N 19/0003; H04N 19/103; G08B 13/19656; G08B 13/1966; H04B 17/318; H04W 52/0245; H04L 1/0003; H04L 1/0009; H04L 1/0017; H04L 65/80
See application file for complete search history.

(56) References Cited

U.S. PATENT DOCUMENTS 7,539,489 B1   5/2009  Alexander
8,855,035 B2  10/2014  Lemoine et al.
(Continued)

FOREIGN PATENT DOCUMENTS

CN    106534634 A    3/2017
CN    106954026 A    7/2017
(Continued)

Primary Examiner — Fernando Alcon
(74) Attorney, Agent, or Firm — Perkins Coie LLP

(57) ABSTRACT

Systems and methods are introduced for rate control of data transmissions in a wireless camera system. In an illustrative embodiment, a computing system selects primary data rates and corresponding fallback data rates to use for transmission of video data. The computing system selects the data rates that provides high-throughput without resulting in wasted energy from retransmissions. The selection may be based upon transmission conditions as well as the record of past data rates, the number of attempts for the data rates, and whether they were successful. These data may be stored as a state machine or for machine learning analysis. Finally, the video data may be aggregated prior to transmission to reduce overhead and improve efficiency.

23 Claims, 7 Drawing Sheets

(51) Int. Cl.

| | | |
|---|---|---|
| H04L 5/00 | (2006.01) | |
| H04N 19/166 | (2014.01) | |
| H04N 19/156 | (2014.01) | |
| H04N 7/18 | (2006.01) | |
| H04N 19/184 | (2014.01) | |
| H04N 19/124 | (2014.01) | |
| H04N 19/40 | (2014.01) | |
| H04L 12/26 | (2006.01) | |
| H04L 29/06 | (2006.01) | |
| H04L 29/08 | (2006.01) | |
| H04W 28/02 | (2009.01) | |
| G08B 13/191 | (2006.01) | |
| G08B 29/18 | (2006.01) | |
| H04N 7/12 | (2006.01) | |
| H04W 36/00 | (2009.01) | |
| H04W 36/30 | (2009.01) | |
| H04W 72/04 | (2009.01) | |
| H04N 19/103 | (2014.01) | |
| H04N 19/42 | (2014.01) | |
| H04B 17/318 | (2015.01) | |
| H04B 17/391 | (2015.01) | |
| H05B 47/19 | (2020.01) | |
| G07C 9/37 | (2020.01) | |
| H05B 47/105 | (2020.01) | |
| G06F 9/54 | (2006.01) | |
| G06K 9/00 | (2006.01) | |
| G06T 7/20 | (2017.01) | |
| G08B 3/10 | (2006.01) | |
| G08B 5/22 | (2006.01) | |
| G08B 13/196 | (2006.01) | |
| G08B 21/18 | (2006.01) | |
| G08B 27/00 | (2006.01) | |
| H04L 1/00 | (2006.01) | |
| H04N 5/247 | (2006.01) | |
| H04N 17/00 | (2006.01) | |
| H04W 24/08 | (2009.01) | |
| H04W 24/10 | (2009.01) | |
| H04W 52/02 | (2009.01) | |
| H04N 19/00 | (2014.01) | |
| H04N 7/14 | (2006.01) | |

(52) U.S. Cl.
CPC . *G08B 13/19656* (2013.01); *G08B 13/19669* (2013.01); *G08B 13/19695* (2013.01); *G08B 21/182* (2013.01); *G08B 27/006* (2013.01); *G08B 29/183* (2013.01); *H04B 17/318* (2015.01); *H04B 17/391* (2015.01); *H04L 1/0003* (2013.01); *H04L 1/0009* (2013.01); *H04L 1/0017* (2013.01); *H04L 1/0033* (2013.01); *H04L 5/0053* (2013.01); *H04L 43/0858* (2013.01); *H04L 43/12* (2013.01); *H04L 43/16* (2013.01); *H04L 65/4084* (2013.01); *H04L 65/608* (2013.01); *H04L 65/80* (2013.01); *H04L 67/1093* (2013.01); *H04N 5/23206* (2013.01); *H04N 5/23227* (2018.08); *H04N 5/23254* (2013.01); *H04N 5/247* (2013.01); *H04N 7/12* (2013.01); *H04N 7/183* (2013.01); *H04N 17/002* (2013.01); *H04N 19/103* (2014.11); *H04N 19/124* (2014.11); *H04N 19/156* (2014.11); *H04N 19/184* (2014.11); *H04N 19/40* (2014.11); *H04N 19/42* (2014.11); *H04W 24/08* (2013.01); *H04W 24/10* (2013.01); *H04W 28/021* (2013.01); *H04W 36/0011* (2013.01); *H04W 36/30* (2013.01); *H04W 52/0245* (2013.01); *H04W 52/0261* (2013.01); *H04W 72/042* (2013.01); *H04W 72/0453* (2013.01); *H05B 47/105* (2020.01); *H05B 47/19* (2020.01); *G06T 2207/30232* (2013.01); *G06T 2207/30241* (2013.01); *H04N 7/147* (2013.01); *H04N 7/181* (2013.01); *H04N 19/00* (2013.01)

(56) References Cited

U.S. PATENT DOCUMENTS

| | | | |
|---|---|---|---|
| 9,179,495 B1 * | 11/2015 | Scherzer | H04W 84/12 |
| 9,451,484 B2 | 9/2016 | Boulton | |
| 9,712,814 B2 | 7/2017 | Tanaka et al. | |
| 10,033,436 B2 | 7/2018 | Thubert et al. | |
| 10,044,104 B1 | 8/2018 | Bartko et al. | |
| 10,177,965 B1 | 1/2019 | Joshi et al. | |
| 10,425,638 B2 | 9/2019 | Yu et al. | |
| 2002/0059627 A1 | 5/2002 | Islam et al. | |
| 2002/0105921 A1 | 8/2002 | Sawyer et al. | |
| 2002/0181637 A1 * | 12/2002 | Nakabayashi | H04L 1/0002 |
| | | | 375/358 |
| 2003/0055908 A1 | 3/2003 | Brown et al. | |
| 2003/0063277 A1 | 4/2003 | Kennedy et al. | |
| 2003/0193525 A1 | 10/2003 | Nygaard | |
| 2005/0086569 A1 * | 4/2005 | Hiddink | H04L 1/0002 |
| | | | 714/749 |
| 2005/0169209 A1 | 8/2005 | Miu et al. | |
| 2008/0020746 A1 | 1/2008 | Alexandar et al. | |
| 2008/0025378 A1 * | 1/2008 | Mahany | H04B 1/707 |
| | | | 375/150 |
| 2008/0026748 A1 | 1/2008 | Alexander et al. | |
| 2008/0112315 A1 | 5/2008 | Hu et al. | |
| 2009/0022222 A1 | 1/2009 | He et al. | |
| 2009/0273679 A1 | 11/2009 | Gere et al. | |
| 2009/0290019 A1 | 11/2009 | McNelis et al. | |
| 2010/0080205 A1 * | 4/2010 | Hirsch | H04L 1/0002 |
| | | | 370/338 |
| 2010/0097472 A1 | 4/2010 | Chathukutty et al. | |
| 2010/0109934 A1 | 5/2010 | Drake et al. | |
| 2010/0285753 A1 | 11/2010 | Foegelle | |
| 2012/0314875 A1 | 12/2012 | Lee et al. | |
| 2013/0021912 A1 | 1/2013 | Finlow-Bates et al. | |
| 2013/0053653 A1 | 2/2013 | Cuddihy et al. | |
| 2014/0051379 A1 | 2/2014 | Ganesh et al. | |
| 2014/0064120 A1 * | 3/2014 | Sethuraman | H04W 24/02 |
| | | | 370/252 |
| 2014/0092755 A1 | 4/2014 | Van De Ven et al. | |
| 2014/0115114 A1 | 4/2014 | Garmark et al. | |
| 2014/0169195 A1 * | 6/2014 | Hsin | H04W 24/06 |
| | | | 370/252 |
| 2014/0169509 A1 | 6/2014 | Tsofe | |
| 2014/0240491 A1 | 8/2014 | Kauniskangas et al. | |
| 2014/0269655 A1 * | 9/2014 | Du | H04L 1/0002 |
| | | | 370/338 |
| 2014/0307707 A1 | 10/2014 | Mestanov et al. | |
| 2015/0185857 A1 | 7/2015 | Jung | |
| 2015/0229426 A1 | 8/2015 | Yu et al. | |
| 2015/0319411 A1 | 11/2015 | Kasmir et al. | |
| 2015/0349859 A1 | 12/2015 | Emmanuel et al. | |
| 2015/0381310 A1 * | 12/2015 | Hammarwall | H04L 1/0003 |
| | | | 370/329 |
| 2016/0105644 A1 | 4/2016 | Smith et al. | |
| 2016/0114887 A1 | 4/2016 | Zhou et al. | |
| 2016/0125714 A1 | 5/2016 | Kates et al. | |
| 2016/0165620 A1 | 6/2016 | Dagen et al. | |
| 2016/0278104 A1 * | 9/2016 | Hiremath | H04L 49/90 |
| 2016/0337243 A1 | 11/2016 | Cui et al. | |
| 2016/0366702 A1 * | 12/2016 | Baba | H04W 74/0825 |
| 2017/0055179 A1 | 2/2017 | Radunovic et al. | |
| 2017/0070732 A1 | 3/2017 | Roulet et al. | |
| 2017/0078242 A1 * | 3/2017 | Nakamura | H04L 61/2007 |
| 2017/0180442 A1 | 6/2017 | Lawrence | |
| 2017/0237673 A1 * | 8/2017 | Law | H04L 47/25 |
| | | | 370/338 |
| 2017/0242129 A1 | 8/2017 | Kallankari et al. | |
| 2017/0244712 A1 | 8/2017 | Meredith et al. | |

(56) References Cited

U.S. PATENT DOCUMENTS

| | | |
|---|---|---|
| 2017/0301201 A1 | 10/2017 | Siann et al. |
| 2018/0306904 A1 | 10/2018 | Vacanti |
| 2018/0375594 A1 | 12/2018 | Kildal et al. |
| 2019/0014388 A1 | 1/2019 | Rutledge et al. |
| 2019/0132371 A1 | 5/2019 | Bhat et al. |
| 2019/0162769 A1 | 5/2019 | Zhao et al. |
| 2019/0202657 A1 | 7/2019 | Li et al. |
| 2019/0222897 A1 | 7/2019 | Frusina et al. |
| 2019/0261370 A1* | 8/2019 | Amini .................. G08B 13/193 |
| 2019/0282897 A1 | 9/2019 | Posin |
| 2019/0364505 A1 | 11/2019 | Wang et al. |

FOREIGN PATENT DOCUMENTS

| | | | |
|---|---|---|---|
| JP | 2010232819 A | * | 10/2010 |
| WO | 2006075052 A1 | | 7/2006 |
| WO | 2009048660 A2 | | 4/2009 |

* cited by examiner derlying the mechanism is a recognition that an increase in the data rate requires less energy to transmit the data but is more likely to cause failed transmissions. Therefore, the transceiver looks for a data rate that increases throughput without incurring excessive retransmissions.

TRANSMISSION RATE CONTROL OF DATA COMMUNICATIONS IN A WIRELESS CAMERA SYSTEM

CROSS-REFERENCE TO RELATED APPLICATION

This application claims priority to U.S. Provisional Patent Application No. 62/633,017, entitled "Optimization and Testing of Wireless Devices," by Emmanuel et al., and filed on Feb. 20, 2018. The content of the above-identified application is incorporated herein by reference in its entirety.

TECHNICAL FIELD

The present disclosure relates to the transmission rate control of data communications between devices in a wireless network, and more specifically to achieving high-throughput data transmissions while conserving power.

BACKGROUND

A wireless data communication network allows various network devices to exchange data. For example, a video surveillance system may provide security by capturing, recording, and transmitting video feeds of activity in a monitored environment. The video feeds may be wirelessly transmitted between the network devices, for example, using wireless transmission techniques with configurable and adjustable transmission data rates.

Video surveillance systems have traditionally relied on cameras that receive power through an electrical line and transmit video data through a data transmission line. The use of electrical and data lines imposes significant costs in terms of installation and maintenance of the system. For example, the installation of conduits in the ground or wall of buildings are typically required to house the electrical and data lines. After significant costs in installation, these electrical and data lines are not easily accessible and thus require significant time and labor to inspect, maintain, and troubleshoot.

To address these issues, video surveillance systems have transitioned to video cameras that use portable batteries as a power source and wireless transmissions to transfer data for storage and view. The use of portable batteries eliminates the need for an electrical line and wireless transmissions eliminates the need for data transmission lines. However, portable batteries store a limited amount of power and thus only provides power for a period of time before requiring a recharge. Additionally, wireless transmissions are susceptible to environmental conditions as well as limitations in the wireless transmission hardware. Therefore, it is common to execute numerous attempts before a transmission is successful. The retransmissions incur additional energy consumption that accelerates the depletion of the limited power provided by a portable battery. For these reasons, video surveillance systems face significant constraints in the operation of wireless video cameras.

BRIEF DESCRIPTION OF THE DRAWINGS

One or more embodiments of the present disclosure are illustrated by way of example and not limited by the figures of the accompany drawings.

DETAILED DESCRIPTION

Figure 1:
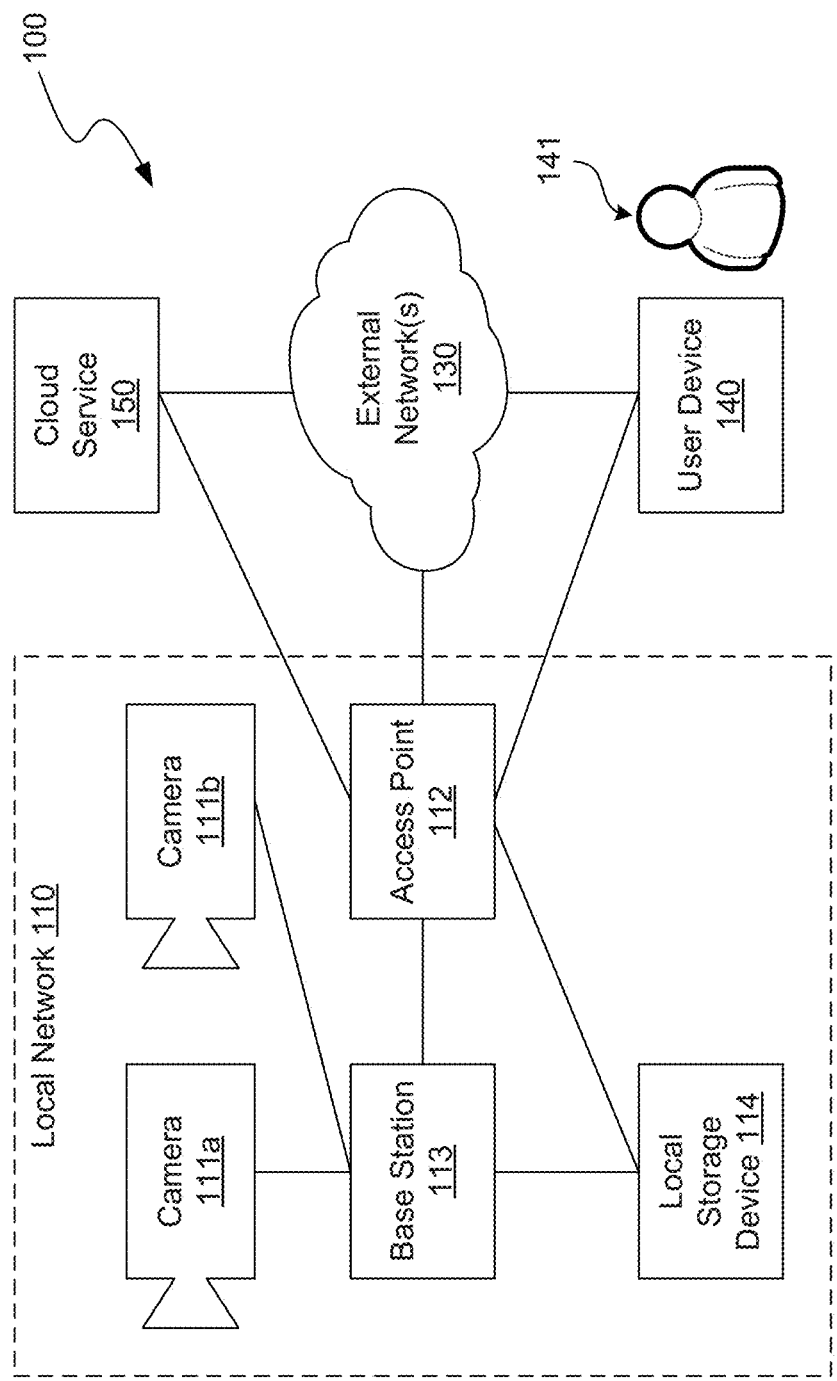
FIG. 1 is a block diagram illustrating an example environment in which the introduced transmission rate control can be implemented.

Wireless video cameras allow users to easily install and maintain a video surveillance system. The wireless video cameras can be installed without the limitations associated with using power transmission lines and data transmission lines. This is accomplished by using wireless communication systems for data communications and portable batteries as a power source.

Wireless video cameras typically rely on portable batteries with a limited power capacity. Power is required by the camera system to performing various functions including: capturing video data, encoding the video data, and transmitting the encoded data. The wireless cameras may use various mechanisms that conserve power to extend the operating time of the wireless cameras between recharges. For example, the wireless cameras may enter a sleep mode by eliminating or reducing power to certain components when they are not in use. However, as will be discussed in detail below, data that is determined and stored during operation may be lost when the device enters a sleep mode. In another example of a mechanism to conserve power, a system may determine data rates that achieve a high-throughput without requiring excessive retransmissions. A higher data rate transmits a larger amount of data but typically results in more failed transmissions. In comparison, a lower data rate requires a longer time to complete a transmission and therefore consumes a higher amount of energy. However, lower data rates usually result in less failed transmissions and therefore requires fewer energy-consuming retransmissions.

Accordingly, introduced here are various aspects of an incremental transmission rate control mechanism that can enable a wireless transceiver (e.g., especially one with a limited power source) to find the most effective data transmission rate. Using this mechanism, a transceiver initially transmits data at a first data rate. The transceiver then incrementally increases the data rate in a step-wise manner. When an increase in the data rate is successful for a subsequent transmission, the transceiver determines that the higher data rate can be used to increase throughput without requiring costly retransmissions. However, when an increase in the data rate results in a greater amount of failed transmissions, the transceiver may determine that the higher data rate is too costly because it consumes significant power during retransmissions. Therefore, the transceiver will revert to the previous data rate or decrement to a lower data rate with a higher likelihood of success. This incremental process may be performed continuously to find an effective data under changing device and environment conditions. An effective data rate represents a data rate that transmits data relatively quickly without requiring too many power-consuming retransmissions. As a result, the effective data rate will allow the wireless transceiver to achieve greater efficiency by providing high-throughput without excessive retransmissions.

In some embodiments, data rates are described using modulation and coding scheme (MCS) values. Each MCS value defines the modulation type, coding rate, and spatial streams used to perform a data transmission. The MCS values may indicate the modulation type that is used such as quadrature amplitude modulation (QAM) and quadrature phase shift keying (QPSK). Additionally, the MCS values indicate the coding rate, which is the ratio of useful data per data generated by the coder. For example, a coding rate of ¾ indicates that for every 3 bits of useful data, the coder generates 4 bits of data to transmit. The additional data is used for redundancy to make the transmission more recoverable and robust. Finally, the MCS values indicate the spatial streams used for the transmission. For example, an MCS value may indicate a spatial stream of 2, which indicates that two streams of data are transmitted within a frequency space. Generally, a higher MCS transports more data but requires a higher signal strength. In one example of the incremental transmission rate control mechanism, a transceiver may initially use MCS4 as the transmission data rate for transmission of a data packet. If the transmission is successful (e.g., without requiring many retransmissions), the transceiver may use MCS5 for a subsequent transmission. MCS5 offers a higher throughput but is more likely to fail compared to MCS4. If, on the other hand, the transmission using MCS4 requires many transmission attempts before succeeding, the wireless transceiver may step down to MCS3 for a subsequent transmission.

In addition to the rate control mechanism introduced above, it is further observed that wireless video cameras occasionally enter sleep mode to conserve energy. When the video camera enters sleep mode, the effective data rate that was determined in the incremental process described above may be lost. Therefore, after emerging from sleep mode, the transceiver must start the incremental process again until the most effective data rate is reached. One problem occurs when a transceiver begins transmission at a high initial transmission rate, resulting in a higher likelihood that the transmission will fail. This is overcome by starting at a very low transmission rate. However, if the initial transmission rate is very low, then more time and energy is consumed to complete the transmission. Additionally, in situations where video data is captured in short bursts, the transmission of a video data burst is completed before the effective data rate is determined.

As such, further introduced herein is a mechanism for transmission rate control that addresses these challenges. In an illustrative embodiment, a video surveillance system uses wireless camera devices that store and maintain information even when it enters a sleep mode. In some embodiments, each wireless camera device stores data that reflects the data rates that was previously used, and the number of attempts made using each rate. In one example, the state information may represent the data rate that was last used before the wireless camera device entered a sleep mode. By preserving the state information during sleep mode, the wireless camera system can execute the incremental transmission rate control mechanism based on the previously determined data rate as the initial data rate. Since the initial data rate uses the previously determined effective data rate, the wireless camera device will likely find the new effective data rate more quickly after emerging from sleep mode than if starting from a default data rate.

Example Operating Environment

FIG. 1 is a block diagram illustrating an example environment 100 in which the introduced mechanism for wireless transmission rate control can be implemented. In some embodiments, the wireless camera system is a security surveillance system that can be installed to secure a surveillance area such as a house, office building, etc. The example environment 100 includes a wireless camera system including local network 110, cameras 111a-b, access point 112, base station 113, local storage device 114, external networks 130, user device 140, user 141, and cloud service 150. The various devices can be connected to each other wirelessly, e.g., over Wi-Fi, or using wired means.

The local network 110 may be implemented as a wireless network comprising wireless networking devices such as cameras 111a-b, access point 112, base station 113, and/or local storage device 114. For example, local network 110 can be a local area network (LAN) or a wireless local area network (WLAN) created by access point 112 and/or base station 113. The external network 130 may comprise one or more networks of any type including packet switched communications networks and/or various other types of telecommunications networks such as cellular networks, plain old telephone system (POTS) networks, etc. In some embodiments, external network 130 may provide access to other network connected devices and services such as user device 140 and cloud service 150. The cloud service 150 is a network of computing resources that are shared across various customers or clients and accessed via a Wide Area Networking (WAN) or other Internet-based access technologies. The user device 140 can be any computing device that can be used by user 141 to connect to a network and play video content. In some embodiments, user device 140 may be a smartphone, a laptop, a desktop, a tablet personal computer (PC), or a smart TV.

Access point 112 provides wireless coverage to devices in local network 110. In some embodiments, access point 112 may be one or more wireless networking devices that provide wireless network connections to client devices such as cameras 111a-b, desktop computers, mobile devices, wearable smart devices, game consoles, smart home devices, etc. A system of multiple network devices may function together as access point 112 to host local network 110 and provide broad, continuous coverage to client devices. Access point 112 may dynamically optimize the wireless connections of the client devices. Additionally, access point 112 may serve as a gateway for connecting the devices of local network 110 to external network 130.

The base station 113 serves as a gateway to securely connect cameras 111a-b to other devices in local network 110. For example, base station 113 may serve as an initial connection point for camera 111a. Cameras 111a can connect to base station 113 to reach other devices in local network 110 (e.g., access point 112 and local storage device 114). Once camera 111a connects to access point 112, it can communicate with the other devices in local network 110 (e.g., local storage device 114 and camera 111b) as well as devices in external network 130 (e.g., user device 140). In some embodiments, base station 113 can be configured to store data from the cameras 111a-b using on-board memory or transfer the data for storage in local storage device 114 or cloud service 150. Additionally, the base station 113 may transcode a video stream received from a camera 111a-b, for example, by decoding an encoded stream and re-encoding the stream into another format to generate a transcoded video stream. In some embodiments, multiple base stations may be used to increase wireless coverage for cameras that are deployed over a large or dense geographic area.

Cameras 111a-b provides the functionality to capture video, encode the video as a video stream, and transmit the video stream via local network 110. In some embodiments, the cameras 111a-b can include one or more sensors that can activate the capturing of video, encoding of captured video, and/or transmission of an encoded video stream when motion is detected. Cameras 111a-b may also include integrated encoder components. Alternatively, or in addition, the encoder component may be a separate device coupled to the wireless cameras 111a-b. In some embodiments, base station 113 includes encoding components to encode video. Encoder components may include any combination of software and/or hardware configured to encode video information. The cameras 111a-b can be battery powered or powered from a wall outlet. When cameras 111a-b are battery powered, the power capacity is limited, and the cameras must be periodically recharged. In some embodiments, cameras 111a-b can be configured to communicate with base station 130. As described above, camera 111a-b can use base station 130 as the initial connection point to reach other devices in local network 110. Alternatively, or additionally, cameras 111a-b may connect directly with access point 112 to reach devices in local network 110. Although the example environment 100 illustrates two cameras 111a-b, the camera system can include just one camera or more than two cameras. In some embodiments all the cameras in the camera system can have same features, or at least some of the cameras can have different features. For example, one camera can be battery powered while another may be powered from the wall outlet.

The transmission rate control system and method described herein can be used to transmit data between the various network devices of example environment 100. For example, video data may be wirelessly transmitted from cameras 111a-b to access point 112, base station 113, local storage device 114, etc. The transmission rate control system and method described herein may be used to ensure that data is wirelessly transmitted with a high-throughput while preventing excess time and energy consumption. In an example embodiment, a user 141 sends a request (e.g., from user device 140) to view a video feed from any of cameras 111a-b. Access point 112 receives the request, obtains the encoded video stream(s), and transmits the encoded video stream to the user device 140 for viewing. The video stream(s) may be obtained directly from cameras 111a-b, local storage 114, cloud storage 150, or some other location.

Figure 2:
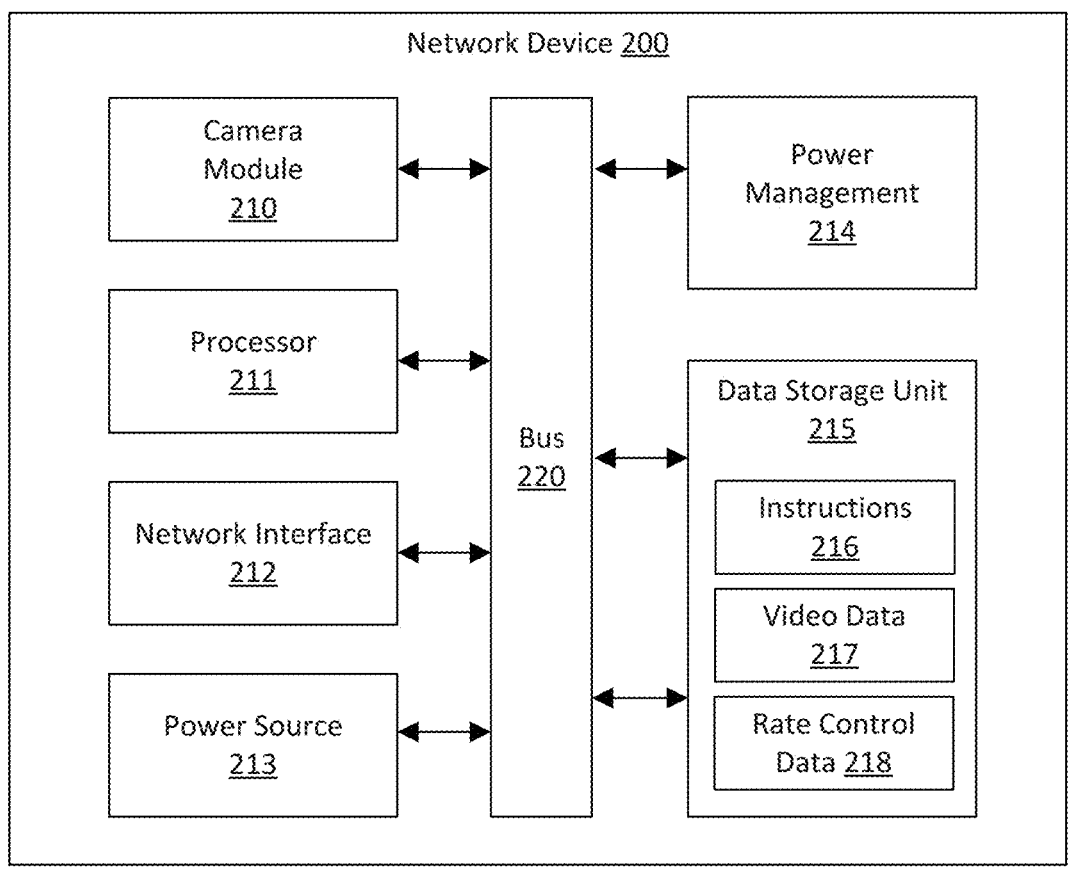
FIG. 2 is a block diagram illustrating an example wireless networking device.

FIG. 2 is a block diagram of an example network device 200 that may implement the functionality of the devices of example environment 100, such as cameras 111a-b. The example network device 200 includes camera module 210, processor 211, network interface 212, power source 213, and power management 214, and data storage unit 215. Additionally, the components of network device 200 may be communicatively coupled via bus 220. Some embodiments of the network device 200 may include fewer or more components than shown in FIG. 2.

Camera module 210 may be used to implement some of the functionality of cameras 111a-b (e.g., to capture video and encode the captured video). For example, camera 210 includes a sensor and image processor for capturing images and generating video data.

Processor 211 may be used to execute program logic, encode the video data from camera module 210, perform transmission rate control, and other computing tasks. In some embodiments, processor 211 executes a rate control mechanism described herein by implementing a state machine. A state machine is typically represented by a graph that is defined by a number of nodes as well as edges connecting the nodes. Each node represents a state that is reached based on previous conditions. The edges of the graph represent the transitions between states that occur when certain conditions are met. In other words, a state machine may be defined by a set of possible states, transitions, and conditions that trigger the transitions. The transitions may be triggered when a condition is met. For example, a condition may be an external input indicating that a packet has been successfully transmitted. When this condition is met, the state machine transitions from one state to another. A state machine is useful because each state is determined based upon a transition from a prior state. In some examples, the state machines may be represented using a Markov chain. Markov chains are characterized such that that the probability of transitioning from the current state to the next state (e.g., selecting a primary data rate) is fixed regardless of how the current state was reached.

Figure 7:
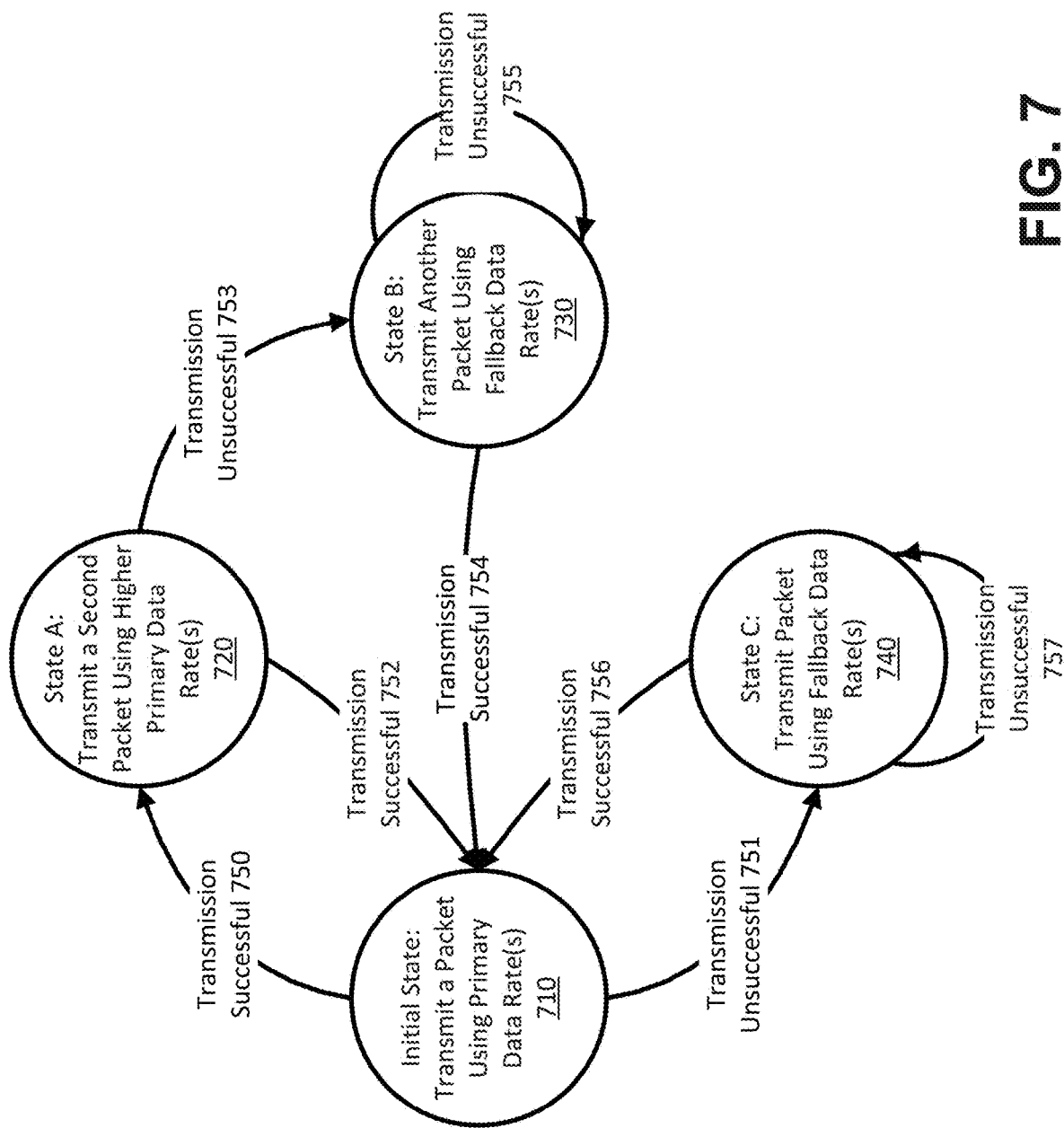
FIG. 7 is a diagram illustrating an example state machine for implementing the introduced transmission rate control mechanism.

FIG. 7 is a diagram of an example state machine 700 that may be implement by processor 211 of network device 200. State machine 700 includes states 710, 720, 730, and 740. Additionally, state machine 700 includes various conditions 750-757.

State machine 700 begins at initial state 710, where network device 200 transmits a packet using a primary data rate. Here, state machine 700 may transition to a different state depending on what conditions are met. For example, if the transmission is successful (750), state machine 700 transitions to state 720, where the network device 200 transmits a second packet using a primary data rate that is higher than the primary data rate used in state 710. However, if the transmission is unsuccessful (751), state machine 700 transitions to state 740, where the network device 200 transmits the packet using fallback data rates.

Moving on to state 720, if the transmission of another data packet using a higher primary data rate is successful (752), then state machine transitions back to state 710 and begins transmission of yet another new packet. However, if the transmission is unsuccessful (753), then state machine 700 transitions to state 730 and transmits the second packet using fallback data rates.

At state 730, the network device 200 transmits the second packet using fallback data rates. In some embodiments, the fallback data rates used in state 730 are associated with the primary data rate of state 720. If the transmission is successful (754), then state machine transitions back to state 710 and begins transmission of yet another new packet. However, if the transmission is unsuccessful (755), then state machine 700 continues transmission of the second packet using various fallback data rates.

At state 740, the network device 200 transmits the first packet using fallback data rates. In some embodiments, the fallback data rates used in state 740 are associated with the primary data rate of state 710. If the transmission is successful (756), then state machine transitions back to state 710 and begins transmission of yet another new packet. However, if the transmission is unsuccessful (757), then state machine 700 continues transmission of the first packet using various fallback data rates.

Figure 3:
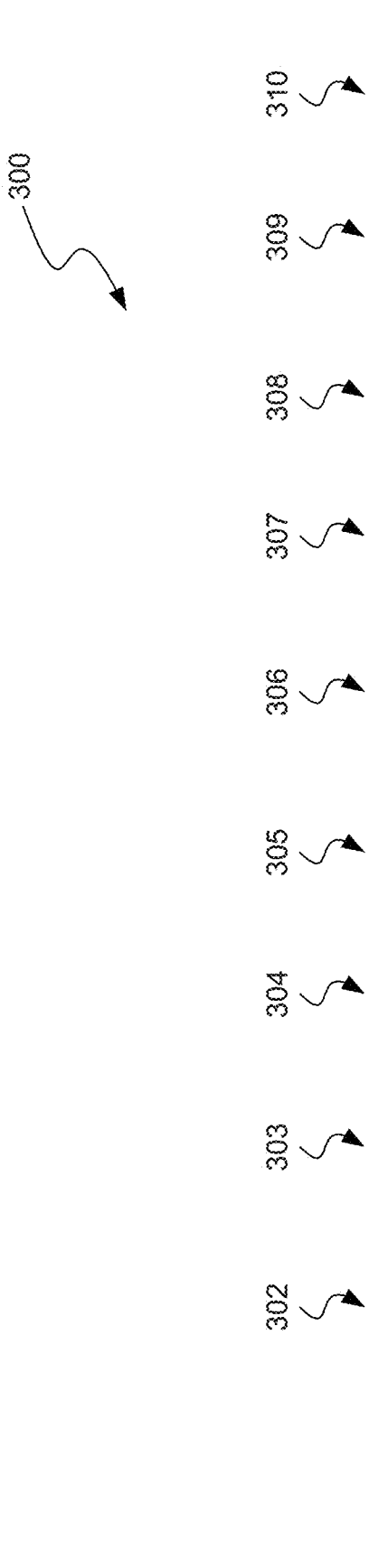
FIG. 3 is a table illustrating an example set of data rates used by wireless networking devices.

In some embodiments, the primary data rates and fallback data rates may be a sequence of data rates (i.e., a data rate ladder) as described in FIG. 3. For example, the primary data rate used in state 710 and fallback data rates used in state 740 may be part of the same data set or data rate ladder. If state 710 uses data set 304 of FIG. 3, then MCS6 is attempted once at state 710. If transmission is successful, then state machine 700 transitions to state 720, where a new, higher primary data rate is selected (e.g., MCS7 of data set 303). If transmission is unsuccessful, then state machine 700 transitions to state 740, where the transmission of the first data packet is transmitted using fallback data rates of data set 304 for designated number of times. As described in FIG. 3, each data rate may be associated with a designated number of attempts. For example, transmission using fallback data rate MCS5 of data set 304 is attempted two times (i.e., condition 757 is triggered two times) or until transmission succeeds. If transmission is still not successful, then transmission using fallback data MCS4 is attempted three times (i.e., condition 757 is triggered three times) or until transmission succeeds.

In some embodiments, each state may represent a transmission attempt using a selected data rate. In yet other embodiments, the state may represent both the data rate selected as well as the number of previous transmission attempts. Additionally, the initial state may represent the selected primary data rate for an initial transmission. If the transmission is successful, then the state machine progresses to a state where a second primary data rate is selected for the transmission of a second packet. However, if the transmission is unsuccessful, the state machine progresses to a state where fallback data rates associated with the primary data rate are used to attempt transmission of the first packet.

In other embodiments, the state may represent the noise detected by a receiver. Noise is the undesired received signal that is not a part of the desired signal (e.g., the signal generated by a transmitter). Noise may result from natural electromagnetic noise (e.g., based upon atmospheric conditions), artificial radio frequency interference, and thermal noise present in the transmitter and receiver. Each state in the state machine may represent a level of noise, wherein the level of noise affects the probability of a successful transmission for each data rate. By looking at the probability of a successful transmission using a primary data rate based upon the level of noise, the system may select the next state based upon the selected primary data rate.

In yet another embodiment, the state may represent the received signal strength determined by a receiver. In one example, the receiver may detect the received signal strength by using the RSSI of received packets. In some embodiments, the RSSI may be determined before the received signal is processed by the intermediate frequency filter. Alternatively, the RSSI may be sampled by an analog-to-digital convertor. By determining the received signal strength, the transceiver can estimate the likelihood of successful transmission given a transmission data rate.

In some embodiments, the state may represent the interference of the wireless environment. In one example, the interference may be determined using a channel condition report. In some embodiments, the interference may be detected by the various devices described in FIGS. 1 and 2, such as cameras 111*a-b*, access point 112, and base station 113. For example, a predictable level of interference may be detected by camera 111*a-b*. In contrast, an unpredictable level of interference may be detected by base station 113. When interference is detected by a device, the device may generate a channel condition report providing data regarding the detected interference. Additionally, or alternatively, a channel condition report may be generated when motion is detected.

Alternatively, or additionally, processor 211 may perform machine learning analysis to implement the rate control mechanisms disclosed herein. Machine learning is the application of data analysis to a data set to identify patterns and make decisions. In the context of rate control as described herein, processor 211 may gather the rate control data 218 as a data set for analysis. As described in detail below, rate control data 218 may indicate what primary data rates were selected, whether the transmission using the primary data rate was successful, what fallback data rates were used if the primary data rate failed, whether fallback data rates were successful, the number of attempts for each fallback data rate, etc. Additionally, rate control data 218 may further include transmission techniques, properties of the packet being transmitted, and the throughput of the data source. In some embodiments, machine learning analysis may also be applied to other data that helps to generate predictions and decisions.

In one example, machine learning may be used to learn a model used for predictions. Specifically, machine learning may take an input (e.g., the primary data rate) and produces an output (e.g., the probability of transmission success using the primary data rate). In order to learn the model, machine learning may use various techniques such as minimizing a cost function. A cost function is used to calculate the difference between an estimated value (e.g., the predicted probability of success) and the actual value (e.g., the observed probability of success). The actual values may be derived, for example, using rate control data 218 described in FIG. 2 or the transmission conditions observed in FIGS. 4-5. Using the actual values, the cost function may be iteratively run against the observed data until the difference is minimized such that the predictions are more accurate.

Various techniques may be used to minimize the cost function. For example, the gradient descent technique allows the model to learn the direction in which predictions are shifted to reduce the difference between the estimated and actual values. Using this technique, the parameters of the model are adjusted, and the resulting adjusted estimated values are observed. By observing numerous adjusted estimates, the parameter values producing the most accurate estimates (i.e., the estimates closest to the actual values) are determined. In some implementations, estimates may be based on a linear regression model. This model uses the simplified mathematical expression $y=a+bx$, wherein x is the input (e.g., the primary data rate used to attempt transmission) and y is the output (e.g., the probability that the transmission using the primary data rate will succeed). In this example, the primary data rate used (i.e., input x) is entered in the mathematical expression to estimate the probability of success (i.e., output y). This output is compared to actual values (i.e., observed probabilities of success). Then, the primary data rate is entered into the mathematical expression containing adjusted parameters (e.g., a' and b') to obtain adjusted estimates. The original estimates and adjusted estimates are compared to determine which estimates are closer to the actual values. If the adjusted estimates are closer, then the adjusted parameters provide a more accurate model for prediction. This process may be performed iteratively such that the parameters are adjusted repeatedly so that an accurate model is obtained.

In some embodiments, models such as sliding windows may be used to implement the rate control mechanisms disclosed herein. In some examples, a sliding window model is used to associate transmission conditions with weight values based upon when the transmission conditions were detected. For example, a transmission environment in a residential environment may temporarily become very congested in the evening when users return home and activate various wireless devices. During the period that devices are being activated, the detected transmission conditions may receive a lower weight value to de-emphasize the temporary, high-level of congestion that is detected. In yet another example, the transmission condition of an office environment may be very high during the day and very low during the evenings. In such an environment, the congestion levels detected during the day are given a high weight value because the congestion levels during the day are more representative of actual operational conditions. Conversely, the congestion level detected during the evening may be given a lower weight because it is not representative of the actual operation conditions.

The state machines, machine learning, and modeling discussed herein may be used to generate predictions of the likelihood that a transmission using a specific transmission rate will be successful. Using the predictions, the processor may generate a decision on which data rates to attempt. These implements are useful because the rate control mechanisms described herein are aimed at selecting transmission rates that have a high probability of success in order to avoid excessive energy consumption resulting from retransmissions. By looking at the generated predictions, the most desirable transmission rate for future transmissions can be selected.

Network interface 212 may be used for exchanging wired and wireless transmissions. In some embodiments, the network interface 212 includes radio components for communication over multiple wireless bands, such as 2.4 GHz band radio, a 5 GHz low band radio, 5 GHz high band radio, and a sub-1 GHz radio. The network interface 212 may also include a network interface 216 for connecting to a wired network and providing overall access to the Internet to the system. In some embodiments, network interface 212 is configured to use best-effort protocols. An example of a best-effort protocol is the User Datagram Protocol (UDP), which is a low-latency and loss-tolerating communication protocol that is suitable for transmitting time sensitive video data. Best-effort protocols do not implement error and flow control mechanisms are to ensure successful data transmission. Alternatively, the network interface 212 is configured to use a reliable transmission protocol such as Transmission Control Protocol (TCP). In contrast to best-effort protocols, a reliable transmission protocol uses error and flow control mechanisms to ensure that a transmission is successful.

Power source 213 provides power to various components of network device 210. Power source 213 may be an adaptor that receives power from an external source such as a power outlet. Alternatively, or additionally, the power source 213 may be a portable battery that stores a finite amount of power. A portable battery typically has the capability to receive power from an external source to replenish the amount of power it stores. As will be described below, various mechanisms including a sleep mode may be used to conserve power that is stored in power source 213.

Power management 214 may be used to manage the power provided by power source 213 to the various components of network device 200. For example, power management 214 may initiate a sleep mode so that components such as camera module 210, processor 211, network interface 212, and/or data storage unit 215 does not receive power when the components are not operating. By using a sleep mode to limit power consumption, network device 200's period of operation before requiring a recharge may be extended. Additionally, power management 214 may regulate the power provided to network interface 212 based on the transmission rates selected to transmit data, the number of transmission attempts, the wait time for packet aggregation, etc.

Data storage unit 215 may be used to store data related to the operation of network device 200. Data storage unit 215 may implemented as volatile memory that loses stored data when it stops receiving power. For example, data storage unit 215 may be implemented using volatile-type random access memory (RAM) that is fast and cost-effective but loses data when it does not receive power. Alternatively, data storage unit 215 may be implemented as non-volatile memory that stores data persistently even in the absence of power. For example, data storage unit 215 may be implemented using flash memory or magnetic storage. By using nonvolatile memory, data storage unit 215 may maintain data that has been stored even when the nonvolatile memory does not receive power. Once the nonvolatile memory receives power again, the stored data is intact and accessible. In another example, data storage unit 215 may use a combination of volatile and non-volatile memory.

Data storage unit 215 may store instructions 216 to be executed by the processor 211. The instructions 216 may include code for operating camera module 210, network interface 212, and any other component of network device 200. Additionally, data storage unit 215 may store video data 217, such as video captured from camera module 210 or processed video from processor 211. In yet other examples, instructions 216 may be used to implement a state machine or perform machine learning as described above.

Data storage unit 215 may also store rate control data 218. Rate control data 218 may include data associated with the transmission rate used by the network interface 212 (e.g., the history of transmission rates and the number of attempts made for each transmission rate). Rate control data 218 may also include transmission data rate tables (e.g., table 300 of FIG. 3). Additionally, rate control data 218 may include data indicating factors affecting data transmission. In some embodiments, factors may include conditions and properties that are used to select the data rates in step 410 of FIG. 4 and/or step 513 of FIG. 5. For example, rate control data 218 may include possible transmission techniques, properties of the packet being transmitted, and the throughput of the data source.

In some embodiments, rate control data 218 is stored on nonvolatile memory of data storage unit 215. Therefore, when data storage unit 215 loses power, the rate control data 218 that is stored remains intact. Once data storage unit 215 receives power again, the rate control data 218 becomes accessible. By using nonvolatile memory, the analysis, predictions, and/or decisions performed using a state machine or machine learning described above may be stored and remain intact even when no power is available for the memory. For example, the state machine may be persistent even when the network device 200 or specifically the data storage unit 215 goes into sleep mode. When the network device 200 or data storage unit 215 resumes operation after sleep mode, the current state of the state machine is accessible, and the transmitter can select the next primary data rate based upon the state information. Similarly, the machine learning analysis can maintain the collection of available data for analysis as well as the predictions that have been generated based upon the analysis.

FIG. 3 is a table 300 illustrating an example of an arrangement of transmission data sets. In some embodiments, cameras 111a-b may each use a table of transmission data sets to determine the transmission rate to transmit video data. In some examples, the values of the tables may be unique to each device, while in other examples the values are identical for each device. For illustrative purposes, table 300 is described as using particular MCS values. However, a person of ordinary skill in the art will recognize that table 300 may have different transmission data rate values, transmission data rate units (e.g., non-MCS defined values such as "1 Mbps"), and/or organization of transmission data rate sets (e.g., different organization of transmission data rate tables, organization of transmission data rates in a list rather than a table, etc.).

Table 300 includes transmission data sets 302-310. In some embodiments, the data sets are arranged adjacent to each other. For example, data sets 302-310 are arranged side-by-side such that each data set occupies one column of table 300. Each transmission data set may include a primary data rate plus one or more predetermined fallback data rates. Each primary data rate and fallback data rate has a transmission data rate value and number of attempts that should be executed for each data rate. For example, as illustrated in Table 300, transmission data set 302 includes a primary data rate value of MCS8 with one attempt, a first fallback data rate value of MCS7 with two attempts, etc. That means that transmission is first attempted using MCS8 one time. If transmission is unsuccessful, then transmission is attempted using MCS7 two times. In some embodiments, transmissions are attempted until transmission is successful or all the data rates of the data rate ladder have been attempted.

The data sets in a data set table may be arranged in a variety of ways. For example, in table 3, data sets 302-310 are arranged based upon the primary data rate of each set. Specifically, the sequence of the primary data rate of each data set 302-310 from left to right is as follows: MCS8, MCS7, MCS6, MCS5, MCS4, MCS3, MCS2, 2 Mbps, and 1 Mbps. In other words, the data sets 302-310 are arranged from the fastest primary data rate on the left-most column to the slowest primary data rate on the right-most column. This arrangement allows a network device to progress through slower primary data rates by shifting to different columns (i.e., data sets) toward the right. In contrast, shifting to the different columns toward the left allows the network device to adjust to faster primary data rates. However, a person of ordinary skill in the art will recognize that other arrangements may be used. For example, the primary data rates may be arranged from lowest to highest. A transmitter may use such an arrangement if it is transmitting critical or high-priority packets. In such a situation, the transmitter may start with a low primary data rate that is slow but more likely to succeed.

In alternative embodiments, the data sets may be arranged based upon the number of attempts of the data rates. In one example, the wireless device may progress through primary data rates that have fewer attempts, regardless of the data rate value. An example of such an arrangement may result in a sequence of primary data rates with its associated number of attempts: MCS1(7), MCS4(6), MCS4(5), MCS7(4), MCS2(3), MCS5(2), and MCS7(1). As noted above, the number of attempts for each primary data rate decreases regardless of the actual data rate. This allows the network device to shift towards columns toward the right in order to utilize primary data rates with less attempts. Since the primary data rate typically has the highest chance for failure, such a shift towards less attempts allows the device to reduce power consumption.

In some embodiments, each data set may have a different amount of data rates. For example, data sets 302-306 each may contain 6 data rates (i.e., one primary data rate and five fallback data rates). In comparison, data sets 307 and 308 each may contain 5 data rates (i.e., one primary data rate and four fallback data rates). Finally, data sets 309 and 310 each may contain 2 data rates (i.e., one primary data rate and one fallback data rate). A data set with less amount of data rates (e.g., data sets 309 and 310) may be suitable for transmitters that are far from the receiver or experience high levels of noise or interference. In this situation, the likelihood of transmission failure is higher. Thus, since success is less likely, it may be desirable to conserve energy by reducing the number of fallback data rates to attempt.

While each data set may have a different number of data rates, typically each data rate has one primary data rate. In some embodiments, by selecting a primary data rate, the transmitter also selects the corresponding sequence of fallback data rates in the data set corresponding to primary data rate. For example, if a transmitter selects MCS8 of data set 302 as the primary data rate, it will attempt MCS8 once, MCS7 two times as the first fallback data rate of data set 302, MCS5 three times as the second fallback data rate of data set 302, etc.

In some embodiments, a middle column (e.g., data set 306) may be designated as the default or initial data set. By using a primary data rate value that is not the fastest nor the slowest, the chance that the initial transmission requires a retransmission is reduced (i.e., a faster data rate results in a higher likelihood of transmission failure). Similarly, by using a primary data rate value that is not the slowest, the chance that the initial transmission requires a large amount of energy is reduced (i.e., a slower the data rate results in a longer period required for transmission).

In some embodiments, each transmission data set 302-310 may be considered a data rate ladder. The top of the data rate ladder may be the primary data rate. Below the primary data rate are one or more fallback data rates. In some examples, these fallback data rates are arranged sequentially starting from the fastest fallback data rate at the top of the fallback data rates to the slowest fallback data rate at the bottom. The resulting data rate ladder contains a primary data rate at top, followed by the fastest fallback data rate below it, and the second fastest fallback data rate below that, and so on. Additionally, each primary data rate and fallback data rate is associated with a designated number of attempts. For example, data set 304 of table 300 may represent a data rate ladder with values starting from the top: MCS6 with one attempt, MCS5 with two attempts, MCS4 with three attempts, MCS3 with five attempts, MCS1 with five attempts, and 1 Mbps with X attempts.

Transmission Rate Control Processes

Figure 4:
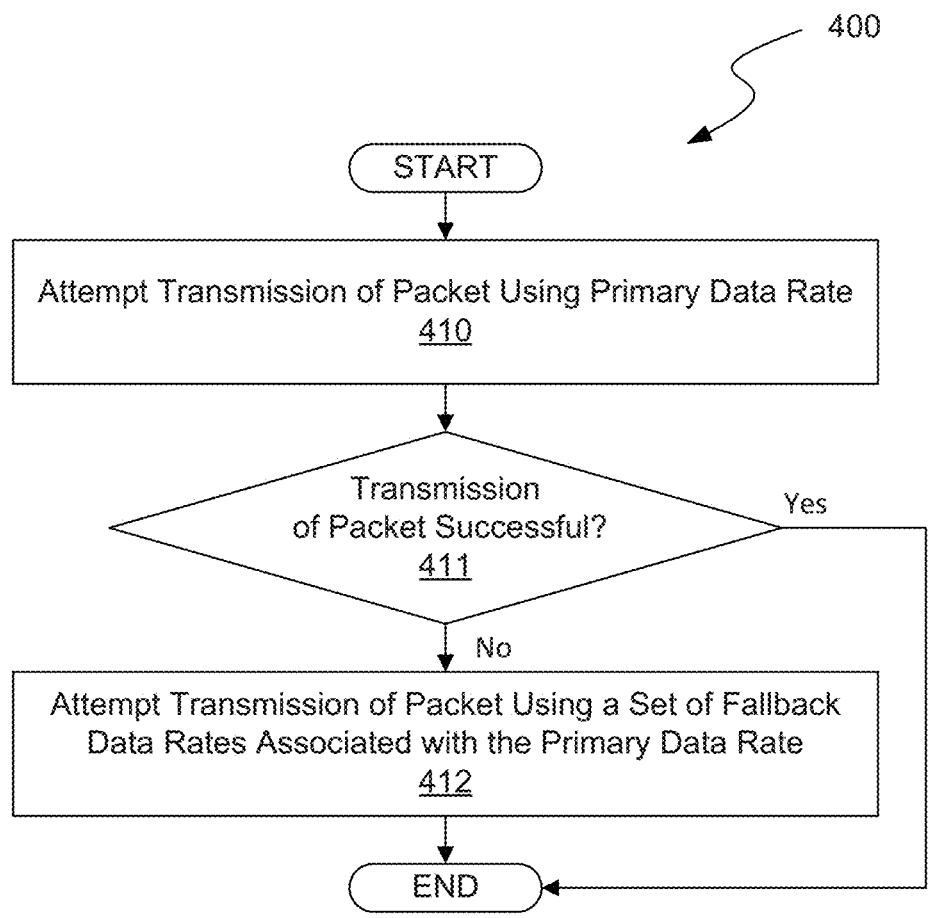
FIG. 4 is a flowchart illustrating an example process for implementing the introduced transmission rate control mechanism.

FIG. 4 is a flowchart illustrating an example process 400 for attempting wireless data transmission using transmission rate control. The process 400 is an example provided for illustrative purposes and is not to be construed as limiting. Other processes may include more or fewer steps than depicted while remaining within the scope of the present disclosure. Additionally, the steps depicted in example process 400 may be performed in a different order than is shown.

For illustrative purposes, the steps of process 400 are described as using the transmission data rates defined in table 3 of FIG. 3. However, a person of ordinary skill in the art will recognize that process 400 may be carried out using different transmission data rate values, transmission data rate units (e.g., non-MCS defined rates), and/or organization of transmission data rate sets (e.g., different organization of transmission data rate tables, organization of transmission data rates in a list rather than a table, etc.). Further, the steps of process 400 may be performed by various devices described in FIGS. 1 and 2, such as network device 200, camera 111a, or camera 111b. Specifically, process 400 may be represented by instructions 216 stored in data storage unit 215 that are then executed by processor 211. However, a person of ordinary skill in the art will recognize that process 400 may be carried out by other devices that perform wireless transmissions.

Process 400 begins at step 410 by attempting to transmit a packet using a selected primary data rate. A primary data rate associated with a transmission data set is selected to determine the transmission data rates that should be used to attempt transmission of the packet. For example, a default primary data rate may be used as the initial primary data rate. As noted above, a high transmission data rate may result in a higher likelihood that the transmission will fail, while a low transmission data rate requires more time and energy complete the transmission. Therefore, a moderate data rate may be selected as the default transmission data rate.

In some examples, the primary data rate may be selected to utilize various transmission techniques. In one example, the primary data rate may be selected to utilize antenna diversity. Antenna diversity is a technique that uses multiple antennas to improve the probability that a transmission will succeed. For example, antenna diversity may reduce a detrimental phenomenon of fading. Fading occurs when a signal bounces off surfaces of the transmission path and become out-of-phase signals, that when combined, cancel out the intended signal. By using multiple antennas that are spaced apart, the transceiver can receive the various signals and identify a signal that has less fading. In some examples, antenna diversity may be implemented using spatial diversity, pattern diversity, transmit/receive diversity, etc. In another example, the primary data rate may be selected to utilize band steering to utilize a less congested frequency band.

In yet other examples, the primary data rate may also be selected based upon the properties of the packet being transmitted. Specifically, the transceiver may want to emphasize the successful transmission of critical or high-priority packets. Therefore, the transceiver may select a primary data rate associated with a transmission data rate set that ensures that a low transmission data rate is attempted before dropping the packet. For example, the primary data rate selected may be associated with a transmission data rate set that attempts MCS8 once, and then MCS0 five times. In some embodiments, the lowest data rate of data rate ladder used for a critical or high-priority packet is attempted more times than the number of attempts for the lowest data rate of a data rate ladder used for a regular packet. By designating multiple attempts with the use of lower data rates, the chance of successful transmission of the critical or high-priority packets is increased.

Additionally, the primary data rate may be selected based upon the size of the packet being transmitted. For example, a packet may be an aggregated packet as described below. An aggregated packet may be larger by increasing the proportion of the data payload compared to fixed overhead such as preambles and headers. Because the length of the packet is increased, there is a greater likelihood that the transmission will be disrupted. Therefore, to improve the probability that a transmission of an aggregated packet will be successful, a lower primary data rate may be selected. However, a longer transmission packet may result in a longer transmission period. The longer transmission consumes more power and generates more heat at the transmitter. Therefore, a higher data rate may be selected to shorten the transmission period of aggregated packets.

In yet other examples, the primary data rate may be adjusted based upon the throughput of a data source. In one embodiment, camera module 210 captures video for processing, storage, or transmission. The captured video may first be encoded into encoded video that is characterized by a bitrate. The network interface 212 may select a primary data rate that is appropriate for the bitrate of the encoded video. For example, the selected primary data rate may have a higher throughput than the bitrate for the encoded video. Therefore, even if the transmission fails using the primary data rate, the fallback data rates may still have enough throughput to transmit the encoded video stream without delay or failures. Although this step is described as being performed by network interface 212 after receiving input from camera module 210, a person of ordinary skill in the art will recognize that step 410 may be carried out by other devices that perform wireless transmissions.

In another example, the primary data rate may be selected based upon transmission conditions. The transaction conditions may be determined in a manner consistent with step 513 of FIG. 5. For example, channel conditions such as signal strength and interference may be determined based upon Received Signal Strength Indicators (RSSI) and channel condition reports, respectively. Additionally, primary data rates may be selected based upon the number of transmission attempts, signal path loss, sensitivity of a transceiver, available power for the transceiver, etc. In some examples, the primary data rate may be selected based upon the state of the state machine implemented by processor 211, which is described in FIG. 2.

As an illustrative example of step 410 of process 400, network device 200 may select MCS6 as the primary data rate that is associated with transmission data set 304. Table 300 indicates that MCS6 should be attempted once. Therefore, a transmission of a packet is attempted once using MCS6.

Step 411 is performed by determining whether the transmission of the packet using the primary data rate (e.g., transmission data rate of MCS6) in step 410 was successful. In some embodiments, the transmission may be performed using a reliable transmission protocol such as the Transmission Control Protocol (TCP). When a reliable transmission protocol is used, the error and flow control mechanisms provided by the protocol can be used to determine whether the transmission is successful. In other embodiments, a best-effort protocol without built-in error and flow control mechanisms is used. Therefore, external error and flow control mechanisms (e.g., higher-level or specifically application-level mechanisms to determine whether there are missing or out-of-sequence packets) can be used to determine the success of transmissions. If the transmission is successful, the process ends because the transmission of the packet is complete. If the transmission is not successful, the process proceeds to step 412.

Step 412 is performed by attempting to transmit the packet using a sequence of fallback data rates associated with the primary data rate selected at step 410. In the example using transmission data set 304, fallback data rate 1 of MCS5 is attempted twice, and fallback data rate 2 of MCS4 is attempted three times. Some primary data rate or fallback data rates may have dynamically configurable number of attempts. For example, table 300 indicates that fallback data rate 5 of transmission data set 304 should be attempted X number of times. The transmission proceeds sequentially in the downward direction from the primary data rate and the various fallback data rates of transmission data set 304 until transmission is successful or until all transmission attempts of the set have been executed.

Figure 5:
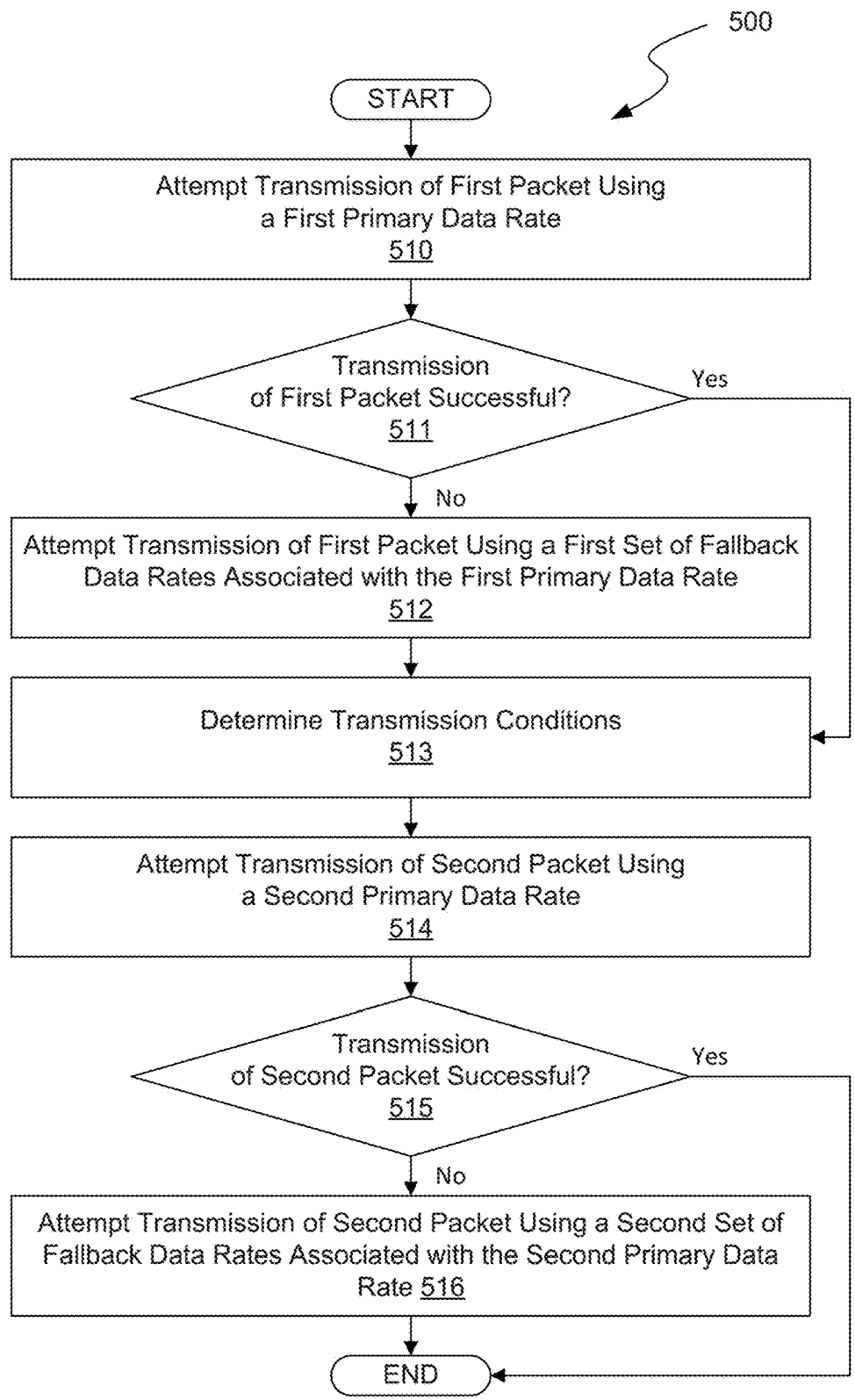
FIG. 5 is a flowchart illustrating another example process for implementing the introduced transmission rate control mechanism.

FIG. 5 is another flowchart illustrating an example process 500 for attempting wireless data transmission using transmission rate control of two packets. The process 500 is an example provided for illustrative purposes and is not to be construed as limiting. Other processes may include more or fewer steps than depicted while remaining within the scope of the present disclosure. Additionally, the steps depicted in example process 500 may be performed in a different order than is shown.

For illustrative purposes, the steps of process 500 are described as using the transmission data rates defined in table 3 of FIG. 3. However, a person of ordinary skill in the art will recognize that process 500 may be carried out using different transmission data rate values, transmission data rate units (e.g., non-MCS defined rates), and/or organization of transmission data rate sets (e.g., different organization of transmission data rate tables, organization of transmission data rates in a list rather than a table, etc.). Further, the steps of process 500 may be performed by various devices described in FIGS. 1 and 2, such as network device in 200, camera 111*a*, or camera 111*b*. Specifically, the process 500 may be represented by instructions stored in data storage unit 215 that are then executed by processor 211. However, a person of ordinary skill in the art will recognize that process 500 may be carried out by other devices that perform wireless transmissions.

Process 500 begins at step 510 by attempting to transmit a packet using a selected primary data rate. Step 511 is performed by determining whether the packet was successfully transmitted using the primary data rate. If the packet was successfully transmitted, then the process proceeds to step 513. If the transmission of step 510 was not successful, step 512 is performed by attempting to transmit the packet using a set of fallback data rates. In some embodiments, steps 510-512 are performed in a manner that is consistent with steps 410-412 described in FIG. 4.

Step 513 is performed by determining transmission conditions. The transmission conditions may include one or more of: the received signal strength, interference, data rates used, number of transmission attempts, signal path loss, sensitivity of the transceiver, available power to a transceiver, etc. In some embodiments, the transceivers of the various network devices continuously sample the wireless channels to determines the various transmission conditions. Additionally, the transceivers may exchange the detected transmission conditions with each other. The transmission conditions may by determined by various network devices, such as cameras 111*a-b*, access point 112, and base station 113. The determined transmission conditions may then be exchanged between the various devices. For example, base station 113 may generate a channel condition report with data regarding an unpredictable level of interference. Similarly, camera 111*a* may generate a channel condition report when motion is detected.

In some embodiments, the determined transmission conditions may be used to determine the state of state machine implemented by processor 211 described in FIG. 2. The state machine represents the transmission conditions and thus may be used to determine the probability that a primary data rate will result in a successful transmission. Additionally, or alternatively, the transmission conditions may be stored for analysis by processor 211 of FIG. 2 using machine learning, adaptive filter interference analysis, algorithmic processing, etc.

In certain embodiments, the transmission conditions determined in step 513 are stored in memory. By storing the transmission conditions in memory, future transmission of packets may use primary data rates that are determined based upon these conditions. For example, the transmission conditions may be stored in nonvolatile memory of data storage unit 215 of FIG. 2. The nonvolatile memory ensures that the transmission conditions remain intact even when the memory does not receive power. Therefore, when network device 200 or specifically data storage unit 215 does not receive power, the transmission conditions are not lost. When network device 200 or data storage unit 215 receives power again, the transmission conditions are accessible and may be used to select new primary data rates.

Step 514 is performed by attempting a transmission of a second packet using another selected primary data rate. In this step, a primary data rate associated with a transmission data set is selected to determine the transmission data rates that should be used to attempt transmission of the second packet. In some embodiments, the primary data rate is selected based on, at least in part, the transmission conditions determined in step 513. Alternatively, or additionally, the primary data rate may be selected in a manner consistent with step 410 of FIG. 4. In other examples, the primary data rate may be selected based upon rate control data 218 of FIG. 2. In yet other examples, the primary data rate may be selected based upon the state machine, machine learning analysis, or adaptive filter interference processing performed by processor 211 of FIG. 2.

In some embodiments, step 514 may be the first step that is performed by a device after it has awoken from sleep mode. If the rate control data 218 were stored in a nonvolatile memory, then those conditions would not have been lost. Therefore, when the device begins to perform step 514 as described herein, the primary data rate selection may be based, at least in part, on the rate control data 218.

In some examples, the RSSI may be detected to estimate the probability that a transmission will be successful given a data rate. For example, if the transceiver wants to avoid excessive retransmissions, it may want to select a primary data rate that is expected to succeed 99 percent of the time given the detected RSSI. Similarly, a primary data rate may be selected based on the detected interference to ensure that there is a high probability that a transmission will succeed. The primary data rate may also be selected based on the data rates selected, the number of transmission attempts, signal path loss, sensitivity of the transceiver, available power to the transceiver, etc.

In some embodiments, the number of attempts executed for each packet may be adjusted based upon various operational criteria. The number of attempts may be lowered to reduce the amount of power expended on retransmission attempts. For example, to reduce the number of retransmissions, each fallback data rate may be tried only once before resorting to the next lower fallback data rate. In another example, a transceiver may be less aggressive on attempting higher rates. Therefore, the transceiver may try higher fallback data rates only once but try lower fallback data rates many times. By being less aggressive on attempting higher rates, the transceiver is focusing on robustness over throughput. In yet another example, higher data rates may only be attempted when the detected RSSI is good, the detected interference is low, or both.

Process 500 proceeds at step 515 by determining whether the second packet was successfully transmitted using the primary data rate selected in step 514. If the packet was successfully transmitted, then process 500 ends. If the packet was not successfully transmitted, then step 516 is performed by attempting to transmit the second packet using a set of fallback data rates. In some embodiments, steps 514-516 are performed in a manner that is consistent with steps 410-412 described in FIG. 4.

Packet Aggregation

The disclosure above describes improving the performance of data transmission through rate control mechanisms. To further enhance the performance of data transmissions, packets can be aggregated before transmissions are attempted using rate control mechanism.

Packet transmission involves the transmission of a packet including a packet overhead and packet payload. The packet overhead may include preambles, physical layer headers, MAC layer headers, etc. For example, headers typically include information about the physical packet, such as the source of the packet, the destination of the packet, the length of the packet, etc. The packet payload includes the actual data that may be used after a packet is successfully transmitted.

One way to reduce this overhead is to perform packet aggregation. Packet aggregation combines more than one packet together into a single unit before transmission. Without packet aggregation, each of those packets would be transmitted individually. By combining multiple packets, the payload of multiple packets only requires one packet overhead section. Consequently, more of the transmission throughput may be used to transmit packet payload rather than overhead. Packet aggregation requires that multiple packets are available to be combined before transmissions. In some situations, packets are not available quick enough to be aggregated before transmission. For example, a packet may be transmitted before a second packet becomes available. This may be especially relevant for video data that is typically generated rapidly or in real-time.

Described herein are mechanisms for applying packet aggregation that addresses this challenge. For illustrative purposes, the packet aggregation mechanisms described herein are performed by various devices described in FIGS. 1 and 2, such as network device 200, camera 111a, or camera 111b. Specifically, the video may be generated by camera module 210, stored in data storage unit 214, and aggregated by processor 211. Additionally, the aggregated packets (e.g., AMPDUs) may also be stored in data storage unit 214. However, a person of ordinary skill in the art will recognize that the packet aggregation mechanism may be carried out by other devices as well.

In one example, the mechanism for packet aggregation is to generate Aggregate MAC Protocol Data Units (AMPDUs) by combining multiple MAC protocol data units (MPDUs). The resulting AMPDU includes a MAC header followed by payload data. One feature of AMPDUs is the capability for selective block acknowledgements. This allows the receiver of the AMPDU to selectively acknowledge the successful reception of individual blocks (i.e., subunits of packet payload).

In some embodiments, the network interface 212 hardware may be configured to adjust the wait period before attempting a transmission. Extending the wait period can be accomplished, for example, by configuring the chipset of network interface 212 that is used for wireless transmissions. In this example, the data to be transmitted is stored for a longer period at network interface 212. By having a longer wait period, there is a greater chance that additional video may become available for aggregation. In another embodiment, program software may be configured to hold video data before the data is provided to the transmission hardware. For example, instructions 216 may be modified such that software executed by processor 211 waits a longer time for video from camera 210. The software may include a socket buffer with a larger capacity or longer wait period for storing video in data storage unit 215 before sending to network interface 212 for wireless transmission. In this example, the data to be transmitted is stored for a longer period at data storage unit 215 before it is sent to network interface 212 for transmission.

The wait time may be adjusted based upon a variety of factors. In one example, the wait time may be adjusted based upon the bit rate of the video encoder. Since video data tends to be fairly homogenous, the encoded video data are generated at a relatively steady rate. Therefore, the wait time can be configured so that an exact amount of data is available for aggregation before transmission. However, in certain situations, the video encoder may adjust the bit rate of the encoded data. For example, a camera may record a static scene with very little data and as a result encoded data become available at a slower rate. In this case, the data may be transmitted without aggregation or a longer wait time may be used in response to the lower encoding bit rate. In other examples, the wait period can be adjusted based on a transmission time slot allotted by the transmission protocol, the data rate of the data transmission, the data rate of the data transmission by accounting for interference, etc.

In adjusting the wait time to facilitate packet aggregation, several considerations must be accounted for. For example, the transmission protocol may limit the aggregated packet length. One reason is that the header of a packet may contain a field that defines the length of the entire packet. The field is a fixed length (e.g., 16 bits) and therefore can only define a limited range of sizes. If an aggregated packet goes beyond that range, transmission will fail because the packet will not be properly defined by the header and the receiver will not be able to determine the actual size of the aggregated packet. In another example, the energy consumed during transmission results in thermal energy at the transmitter. As the transmitter gets hotter, the signal quality becomes degraded. In a specific case, the error vector magnitude may drop significantly towards the end of a transmission period for a long, aggregated packet. Therefore, the transmission duration may be limited to avoid long transmissions that result in excessive heat and to allow the transmitter to cool down.

Example Computing System

Figure 6:
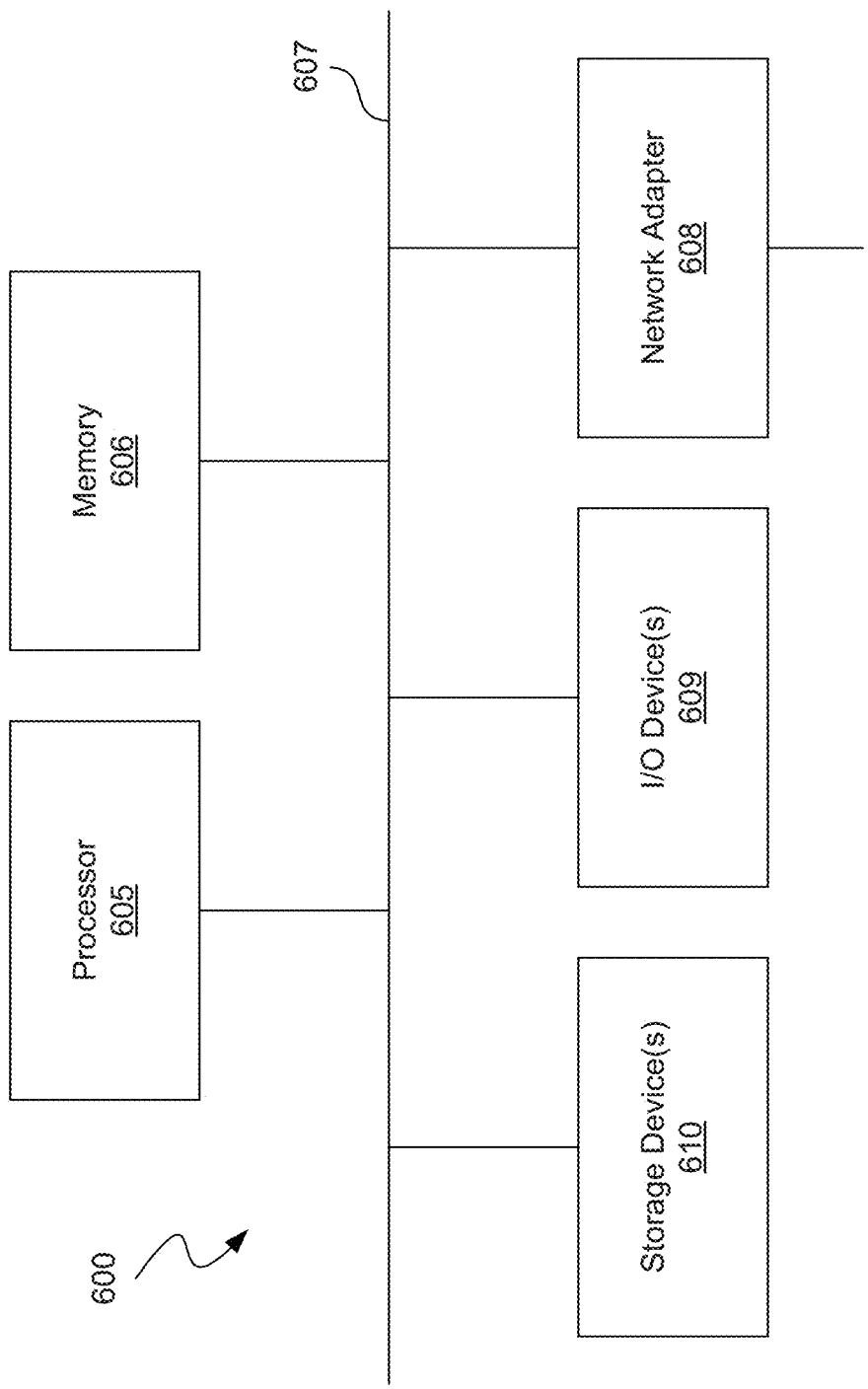
FIG. 6 is a block diagram illustrating an example processing system in which at least some of operations described herein can be implemented.

FIG. 6 is a block diagram of an example computer system 600 as may be used to implement certain features of some of the embodiments described herein. For example, computer system 600 may be used to implement cameras 111a-b, access point 112, base station 113, local storage device 114, and user device 140. Additionally, the computer system 600 may be a server computer, a client computer, a personal computer (PC), a user device, a tablet PC, a laptop computer, a personal digital assistant (PDA), a cellular telephone, a telephone, a web appliance, a network router, switch or bridge, a console, a hand-held console, a (hand-held) gaming device, a music player, any portable, mobile, hand-held device, wearable device, or any other machine capable of executing a set of instructions (sequential or otherwise) that specify actions to be taken by that machine.

The computing system 600 may include one or more processing units (e.g., central processing units (CPU) and/or graphical processing units (GPU) (collectively the "processor") 605, one or more memory units (collectively "memory") 606, one or more input/output devices 609 (e.g. keyboard and pointing devices, touch devices, display devices, audio input/output devices, etc.) one or more storage devices 610 (e.g. disk drives, solid state drives, etc.), and one or more network adapters 608 (e.g., network interfaces) that can communicatively couple via an interconnect 607. The interconnect 607 is illustrated as an abstraction that represents any one or more separate physical buses, point to point connections, or both connected by appropriate bridges, adapters, or controllers. The interconnect 607, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, an Institute of Electrical and Electronics Engineers (IEEE) standard 1394 bus (also called Firewire), or any other suitable system for facilitating communication between the various components of the example computing system 600.

The memory 606 and storage device 610 are computer-readable storage media that may store instructions that implement at least portions of the various embodiments. In addition, the data structures and message structures may be stored or transmitted via a data transmission medium (e.g., a signal on a communications link). Various communications links may be used such as the Internet, a local area network, a wide area network, or a point-to-point dial-up connection, etc. Thus, computer readable media can include computer-readable storage media, e.g. non-transitory media, and computer-readable transmission media.

The instructions stored in memory 606 can be implemented as software and/or firmware to program the processor 605 to carry out actions described above. In some embodiments, such software or firmware may be initially provided to the processor 605 by downloading the software or firmware from a remote system through the computing system 600, e.g. via network adapter 608.

The various embodiments introduced herein can be implemented by, for example, programmable circuitry, e.g. one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

What is claimed is:

1. A network device, comprising:
a camera configured to generate a video stream;
a processor configured to convert the video stream into a plurality of data packets; and
a network interface configured to:
perform a first transmission of a first packet of the plurality of data packets using a first data rate ladder, wherein the first data rate ladder includes a first primary data rate and a first set of fallback data rates, and wherein the first transmission attempts transmission of the first packet using the first primary data rate and then the first set of fallback data rates; and
perform a second transmission of a second packet of the plurality of data packets using a second data rate ladder, wherein the second data rate ladder includes a second primary data rate and a second set of fallback data rates, wherein the second transmission attempts transmission of the second packet using the second primary data rate and then the second set of fallback data rates, and wherein the second data rate ladder is selected based in part on the primary and fallback data rates used and number of attempts performed by the first transmission.

2. The network device of claim 1, wherein each primary and fallback data rate is associated with a designated number of transmission attempts.

3. The network device of claim 1, wherein the second primary data rate is selected based upon channel condition data including one or more of: a received signal strength indicator (RSSI) of the channel and a channel condition report.

4. The network device of claim 1, wherein the second data rate ladder is selected based upon the size of the second packet.

5. The network device of claim 1, wherein the second primary data rate is selected to utilize antenna diversity and/or band steering techniques.

6. The network device of claim 1, wherein each fallback data rate of the first set of fallback data rates is slower than the first primary data rate and each fallback data rate of the second set of fallback data rates is slower than the second primary data rate.

7. The network device of claim 6, wherein the second packet is a higher priority than the first packet and the lowest data rate of the second data rate ladder is attempted more times than the lowest data rate of the first data rate ladder is attempted.

8. The network device of claim 1, wherein:
the first transmission is performed until transmission of the first packet is successful or all the data rates of the first data rate ladder have been attempted; and
the second transmission is performed until transmission of the second packet is successful or all the data rates of the second data rate ladder have been attempted.

9. The network device of claim 1, wherein:
a memory configured to store state information related to the attempted transmissions, the state information including the data rate and number of attempts used to transmit the first packet.

10. The network device of claim 9, wherein the state information includes one or more of: a Received Signal Strength Indicator (RSSI) and a channel condition report.

11. The network device of claim 9, wherein the memory stores the state information when the network device is in a sleep mode, the stored information accessible when the network device exits sleep mode.

12. The network device of claim 1, wherein the first and second data rate ladders include a plurality of modulation and coding schemes (MCS) entries, each MCS entry indicating a quadrature phase-shift keying (QPSK) or quadrature amplitude modulation (QAM) modulation process associated with the entry.

13. The network device of claim 1, wherein the first and/or second packet are each an Aggregated MAC Protocol Data Unit (AMPDU) packet comprising more than one data packet from the plurality of data packets aggregated at a buffer.

14. The network device of claim 13, wherein the number of data packets in the first and/or second AMPDU is determined by one or more of: the allotted transmission time, the bit rate of the video encoder, the first primary data rate, the detected channel interference, and the target data throughput.

15. The network device of claim 13, wherein the second primary data rate is selected based upon up the size of the AMPDU packet.

16. A method for transmitting data packets, the method comprising:
executing a first number of transmission attempts to transmit a first data packet using a first primary data rate from a first data rate ladder,
determining whether the first data packet was successfully transmitted using the first primary data rate;

executing a first number of fallback transmission attempts, if the first data packet was not successfully transmitted, using a first sequence of fallback data rates from the first data rate ladder, wherein the first primary data rate and each fallback data rate are associated with a designated number of transmission attempts;

executing a second number of transmission attempts to transmit a second data packet using a second primary data rate from a second data rate ladder, the second primary data rate selected based in part on the data rates and transmission attempts of the first data packet;

determining whether the second data packet was successfully transmitted using the second primary data rate; and executing a second number set of fallback transmission attempts, if the second data packet was not successfully transmitted, using a second sequence of fallback data rates from the second data rate ladder, wherein the second primary data rate and each fallback data rate are associated with a designated number of transmission attempts.

17. The method of claim 16, wherein:

the first sequence of fallback data rates contains a set of data rates that progressively decrease and are lower than the first primary data rate; and the second sequence of fallback data rates contains a set of data rates that progressively decrease and are lower than the second primary data rate.

18. The method of claim 16, wherein, the second packet is a higher priority than the first packet and the lowest data rate of the second data rate ladder is attempted more times than the lowest data rate of the first data rate ladder is attempted.

19. The method of claim 16, wherein the first and/or second packet are each an Aggregated MAC Protocol Data Unit (AMPDU) packet comprising more than one data packet from the plurality of data packets aggregated at a buffer.

20. The method of claim 16, wherein the second primary data rate is selected based upon channel condition data including one or more of: a received signal strength indicator (RSSI) of the channel and a channel condition report.

21. The method of claim 16, further comprising:

storing state information including the history of selected data rates and the number of attempts executed for each data rate.

22. The method of claim 21, wherein the state information is maintained in a memory of a network device and is accessible after the network device exits a sleep mode.

23. The method of claim 21, wherein the state information further indicates one or more of: the noise and interference of a transmission environment where the transmissions are attempted.

* * * * *